United States Patent

[11] 3,631,284

[72] Inventor Thomas E. Sisneros
 Fort Wayne, Ind.
[21] Appl. No. 701,040
[22] Filed Jan. 19, 1968
[45] Patented Dec. 28, 1971
[73] Assignee International Telephone and Telegraph Corporation
 Nutley, N.J.

[54] RED-EMITTING MATERIAL FOR CATHODOLUMINESCENT SCREENS
 2 Claims, 2 Drawing Figs.

[52] U.S. Cl. .................................................. 313/92, 252/301.4
[51] Int. Cl. .................................................. C09k 1/04, H01j 29/20
[50] Field of Search........................................... 252/301.4; 313/92

[56] References Cited
 UNITED STATES PATENTS
 3,497,458 2/1970 Schuil........................... 252/301.4 R
 3,301,791 1/1967 Brixner......................... 252/301.4

OTHER REFERENCES

Blasse et al., On the Eu $^+$ Fluorescence in Mixed Metal Oxides— Journal of Chemical Physics, Vol. 45, No. 9, Nov. 1, 1966, pages 3,327– 3,332

Primary Examiner—Robert D. Edmonds
Attorneys—C. Cornell Remsen, Jr., Rayson P. Morris, Percy P. Lantzy, Philip M. Bolton and Isidore Togut ABSTRACT: A phosphor of europium activated lithium indate provides a red-emitting luminescent material of high brightness and good chromaticity and stability under electron beam excitation. The concentration of europium is relatively low in comparison with other similarly activated phosphors.

INVENTOR
THOMAS E. SISNEROS
BY Edward Goldberg
ATTORNEY 3,631,284

1
RED-EMITTING MATERIAL FOR CATHODOLUMINESCENT SCREENS

BACKGROUND OF THE INVENTION

1. Field of the Invention

This invention relates to a novel phosphor for color cathode-ray tubes and particularly to an improved red-emitting material having a high-luminous output with low concentrations of europium.

2. Description of the Prior Art

Present red-emitting phosphor materials include yttrium vanadate activated with europium, $YVO_4$:Eu; yttrium oxide with europium, $Y_2O_3$:Eu; yttrium oxysulfide with europium, $Y_2O_2S$:Eu; and cadmium - zinc sulfide activated with silver, (Cd, Zn) S:Ag. U.S. Pat. No. 3,243,625 issued Mar. 29, 1966, describes the various advantages and shortcomings of some of these materials employed in color television tubes and particularly the improvement in the red color emission and brightness provided by $YVO_4$:Eu. While $Y_2O_3$:Eu has a higher luminous efficiency, it has an emission color on the orange side of the red portion of the frequency spectrum. $YVO_4$:Eu, however, has a sufficiently high efficiency with improved red characteristics. In general, europium-activated materials provide a greater color stability and linearity of response with changes of electron beam current or brightness, in comparison with known sulfide materials which change colors somewhat under varying conditions.

The presently known europium phosphor compounds however require at least 4–5 percent europium for best color results and tend to change toward orange at lower concentrations. The yttrium oxysulfide compound, in addition, requires a costly and difficult preparation process. Another phosphor composed of europium activated lithium indate, $LiInO_2$:Eu, was previously prepared and examined under ultraviolet excitation, but was considered as having too low an efficiency for satisfactory performance. This material was one of many europium activated phosphors reported in an article entitled "On the $Eu^{3+}$ Fluorescence in Mixed Metal Oxides. V. The $Eu^{3+}$ Fluorescence in the Rocksalt Lattice," by G. Blasse and A. Bril, published in the Journal of Chemical Physics, Nov. 1, 1966. The present inventor however has discovered that this composition, made of particular mixtures of materials in specified proportions, provides a highly efficient red-emitting cathodoluminescent phosphor.

SUMMARY OF THE INVENTION

It is therefore the primary object of the present invention to provide a novel red-emitting luminescent material of high brightness and good color response and stability for use in color cathode-ray tubes. This is achieved with europium-activated lithium indate, $LiInO_2$:Eu, as the red-emitting phosphor forming portions of the luminescent screen coating which provides color displays under electron beam excitation. The material is prepared by firing a particular mixture of lithium, indium, and europium compounds which provide highly efficient stable emission in the red region of the visible spectrum with relatively small proportions of europium. The details of the invention will be more fully understood and other objects and advantages will become apparent by reference to the following description and accompanying drawings.

Figure 1:
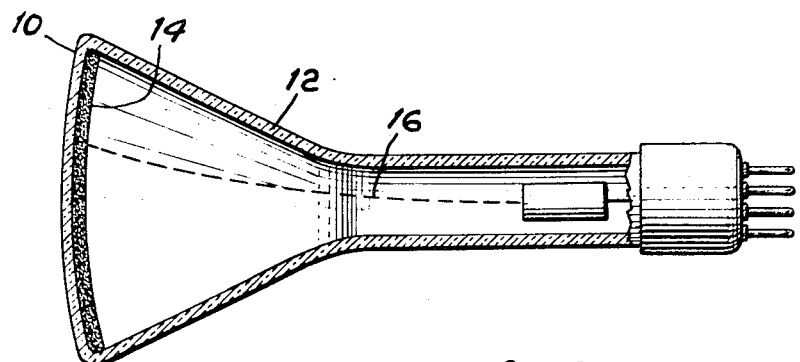
FIG. 1 is a schematic representation of a cathode-ray tube having a luminescent screen including the novel phosphor of the invention.

2
DESCRIPTION OF THE PREFERRED EMBODIMENT

The europium-activated lithium indate phosphor is prepared by a solid-state reaction between a lithium compound that readily decomposes at specified firing temperatures in the presence of an indium compound, and includes such materials as lithium nitrate, $LiNO_3$, lithium carbonate, $LiCO_3$, lithium acetate, $LiC_2H_3O_2$, or lithium oxalate, $Li_2C_2O_4$. The indium compound may include indium oxide, $In_2O_3$, indium nitrate, $In(NO_3)_3$, indium acetate, $In(C_2H_3O_2)_3$, indium oxalate, $In_2(C_2O_4)_3$ or other indium compounds that decompose into the oxide in the presence of a lithium compound. The mixture includes a europium compound such as europium oxide, $Eu_2O_3$, europium nitrate, $Eu(NO_3)_3$, europium acetate, $Eu(C_2H_3O_2)_3$, or europium oxalate, $Eu_2(C_2O_4)_3$ that will combine with lithium indate. $LiNO_3$ and other lithium compounds have been found to give better results than $Li_2CO_3$, probably due to the fact that they decompose to the oxide more readily than $Li_2CO_3$. The latter can also provide good results by using longer firing times and/or higher firing temperatures.

The starting materials in the form of powders are mixed together and fired at from 900°–1,300° C. in a nonreducing atmosphere such as air, oxygen, or oxygen with an inert gas. Higher temperatures may also be used, although some of the $Li_2O$ and $In_2O_3$ may be lost due to volatilization. The firing time can vary from 1 hour or less to many hours and multiple firings with interposed grinding steps may be used to provide a product having a more complete reaction. The final compounds are in the form of powders and crystals. The technique is similar to that of preparing europium-activated yttrium vanadate, $YVO_4$:Eu, as described in U.S. Patent No. 3,152,085 issued Oct. 6, 1964.

The europium concentrations can vary between 0.1 mole percent and 10 mole percent. The optimum concentrations have been found to be in the 0.5 to 7 percent range with some of the best results being obtained with 1 percent Eu. This is lower than most other europium-activated phosphors such as $YVO_4$:Eu, $Y_2O_3$:Eu and $Y_2O_2S$ : Eu which require 4 percent or more to provide good brightness, but which change colors with lower concentrations. Since europium compounds are quite costly, it is advantageous and more efficient to use smaller concentrations.

The following are some examples of starting compositions for preparing $LiInO_2$:Eu using different concentrations of Eu.

[Grams]

| $LiIn_{0.95}O_2$:0.05Eu | | $LiIn_{0.95}O_2$:0.05Eu | | $LiIn_{0.99}O_2$:0.01Eu | |
|---|---|---|---|---|---|
| 0.74 | $Li_2CO_3$ | 1.38 | $LiNO_3$ | 1.38 | $LiNO_3$ |
| 2.64 | $In_2O_3$ | 5.72 | $In(NO_3)_3$ | 2.78 | $In_2O_3$ |
| 0.176 | $Eu_2O_3$ | 0.176 | $Eu_2O_3$ | 0.035 | $Eu_2O_3$ |

The examples below are all for $LiIn_{0.99}O_2$:0.01Eu

| 2.04 | $LiC_2H_3O_2 \cdot 2H_2O$ | 1.02 | $Li_2C_2O_4$ | 1.38 | $LiNO_3$ |
|---|---|---|---|---|---|
| 2.78 | $In_2O_3$ | 2.78 | $In_2O_3$ | 2.78 | $In_2O_3$ |
| .035 | $Eu_2O_3$ | .035 | $Eu_2O_3$ | .057 | $Eu_2(C_2O_4)_3$ |
| 1.38 | $LiNO_3$ | 1.38 | $LiNO_3$ | 1.38 | $LiNO_3$ |
| 4.94 | $In_2(C_2O_4)_3$ | 2.78 | $In_2O_3$ | 5.84 | $In(C_2H_3O_2)_3$ |
| .035 | $Eu_2O_3$ | .068 | $Eu(NO_3)_3$ | .035 | $Eu_2O_3$ |
| 1.38 | $LiNO_3$ | | | | |
| 2.78 | $In_2O_3$ | | | | |
| .066 | $Eu(C_2H_3O_2)_3$ | | | | |

Figure 2:
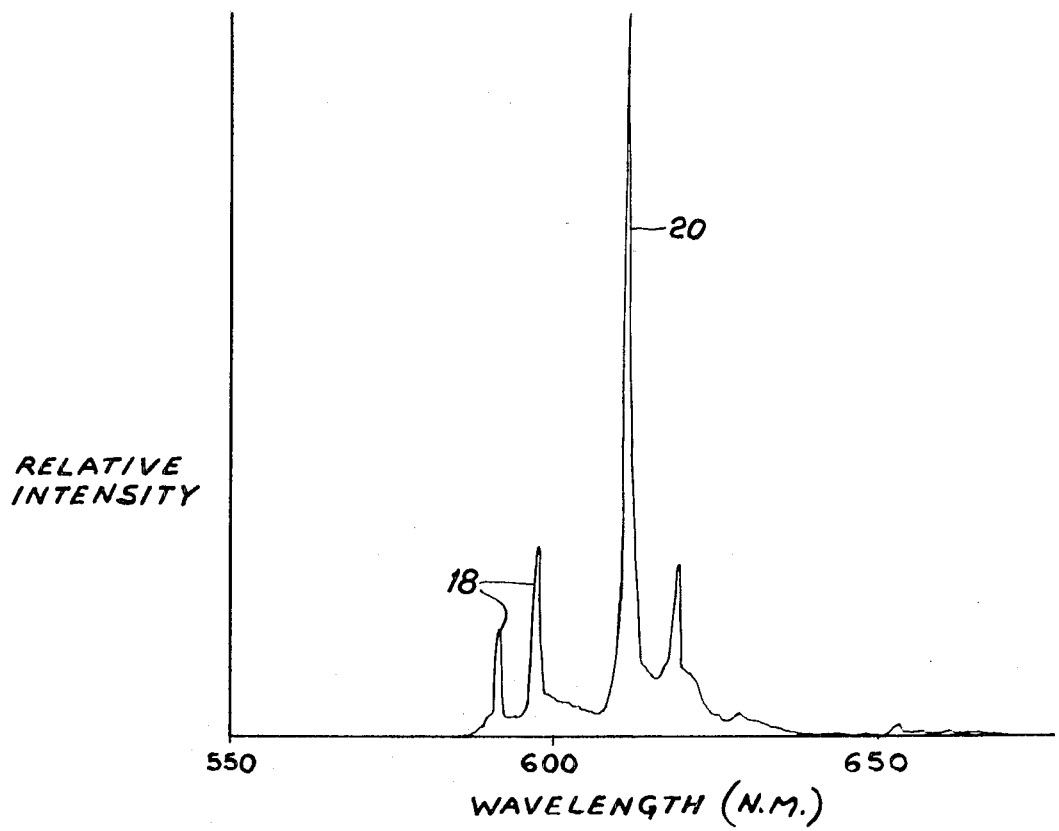
FIG. 2 shows a response curve of relative emission intensity in a band of wavelengths in the red region of the visible spectrum.

As shown in FIG. 1, the novel phosphor is coated onto a faceplate 10 of a cathode-ray tube 12 in any suitable manner, such as by known settling, slurry or dusting techniques, to form a luminescent screen 14 or portion thereof. When excited by an electron beam 16, the phosphor luminesces in a bright red color having several low-level peaks 18 and one narrow high-level emission band 20, as indicated in the spectral response curve of Relative Intensity versus Wavelength in nanometers, as shown in FIG. 2. For test purposes, the material was arranged in a holder within a specially built cathode-ray tube and was subjected to an electron beam current of 0.5 microamps/cm.$^2$ with 10 kilovolts applied between the electron gun and holder. From this curve and the following table of relative properties of various phosphors, as taken from the known International Standard C.I.E. chromaticity diagram, it is seen that the $LiInO_2:Eu$ has a desirable red color response and the highest lumen equivalent or ratio of luminous output to total radiant output. Luminous output readings taken with a standard filter and photomultiplier arrangement have given values 30 percent higher than for $YVO_4:Eu$. The composition tested in the present case used a concentration of 1 percent europium which maintained color stability at varying concentrations, while other europium compounds utilized approximately 5 percent concentration and normally change color at substantially lower percentages.

| Phosphor | Chromaticity diagram coordinates | | Approximate lumen equivalent, lumens/rad. watt |
|---|---|---|---|
| | x | y | |
| $Cd_{0.8}Zn_{0.2}S:Ag$ | 0.66 | 0.34 | 80 |
| $YVO_4:Eu$ | 0.67 | 0.33 | 250 |
| $Y_2O_3:Eu$ | 0.64 | 0.36 | 305 |
| $Y_2O_2S:Eu$ | 0.66 | 0.34 | 255 |
| $LiInO_2:Eu$ | 0.65 | 0.35 | 330 |

The red-emitting phosphors are readily combined in a known manner with the other primary green and blue color phosphors in a desired pattern to form a screen for a color television tube.

As described in the aforementioned U.S. Patent No. 3,243,625, europium-activated compounds provide an improved efficiency, linearity and color stability over cadmium and zinc sulfide phosphors. In addition, as indicated in the table of red-emitting materials, the novel $LiInO_2:Eu$ composition of the present invention provides a higher luminous output in comparison with other similarly activated compounds, as well as good stable red color characteristics upon excitation by an electron beam.

While only a single embodiment has been illustrated, it is to be understood that the invention is not limited to the exact form or use shown and that other variations may be made in the particular configuration and material without departing from the scope of the invention as set forth in the appended claims.

What is claimed is:

1. A cathode-ray tube comprising an evacuated envelope having a faceplate at one end, a phosphor screen on the inner surface of said faceplate, an electron gun at the other end of said envelope, said screen including a phosphor of europium-activated lithium indate having the formula $LiInO_2:Eu$ which emits a red color in the visible region of the spectrum upon excitation by an electron beam from said gun.

2. The device of claim 1 wherein said phosphor is activated by between 0.1 and 10 mole percent europium and has relatively stable color characteristics in that range.

* * * * *